United States Patent
Hong (10) Patent No.: US 11,265,793 B2
(45) Date of Patent: Mar. 1, 2022

(54) METHOD AND APPARATUS FOR DETERMINING MOTION STATE OF USER EQUIPMENT

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 10 days.

(21) Appl. No.: 16/763,490

(22) PCT Filed: Nov. 16, 2017

(86) PCT No.: PCT/CN2017/111289
§ 371 (c)(1),
(2) Date: May 12, 2020

(87) PCT Pub. No.: WO2019/095184
PCT Pub. Date: May 23, 2019

(65) Prior Publication Data
US 2020/0336963 A1    Oct. 22, 2020

(51) Int. Cl.
*H04W 36/32* (2009.01)
*H04W 36/00* (2009.01)

(52) U.S. Cl.
CPC ....... *H04W 36/32* (2013.01); *H04W 36/0061* (2013.01); *H04W 36/00837* (2018.08)

(58) Field of Classification Search
CPC ........... H04W 36/32; H04W 36/00837; H04W 36/0061; H04W 36/245; H04W 36/0083; H04W 36/24
See application file for complete search history.

(56) References Cited

U.S. PATENT DOCUMENTS

| 2004/0152480 A1 | 8/2004 | Willars et al. |
| 2008/0108353 A1 | 5/2008 | Lee et al. |
| 2013/0023272 A1 | 1/2013 | Watanabe et al. |

(Continued)

FOREIGN PATENT DOCUMENTS

| CN | 101175328 A | 5/2008 |
| CN | 101730081 A | 6/2010 |

(Continued)

OTHER PUBLICATIONS

ISA State Intellectual Property Office of the People's Republic of China, Written Opinion of the International Searching Authority Issued in Application No. PCT/CN2017/111289, dated Jul. 30, 2018, WIPO, 9 pages.

(Continued)

*Primary Examiner* — Marisol Figueroa
(74) *Attorney, Agent, or Firm* — Finnegan, Henderson, Farabow, Garrett & Dunner, L.L.P.

(57) ABSTRACT

A method for determining a motion state of user equipment includes: recording information on a neighboring cell that neighbors with a cell where the user equipment is located; determining a number of one or more pieces of the information on the neighboring cell recorded in unit time, and determining the motion state of the user equipment based on relationship between the determined number and one or more preset numbers as well as association of the relationship with at least one motion state.

15 Claims, 6 Drawing Sheets

(56) References Cited

U.S. PATENT DOCUMENTS

| | | | |
|---|---|---|---|
| 2014/0295770 A1 | 10/2014 | Song et al. | |
| 2014/0341192 A1 | 11/2014 | Venkob et al. | |
| 2020/0236605 A1* | 7/2020 | Yiu | H04W 36/24 |
| 2020/0383017 A1* | 12/2020 | Tsuda | H04W 36/00835 |

FOREIGN PATENT DOCUMENTS

| | | |
|---|---|---|
| CN | 102088718 A | 6/2011 |
| CN | 103167551 A | 6/2013 |
| CN | 104170467 A | 11/2014 |
| CN | 104170470 A | 11/2014 |
| CN | 106304172 A | 1/2017 |
| CN | 106454715 A | 2/2017 |

OTHER PUBLICATIONS

Office Action and Search Report Issued in Application No. 2017800019423, from State Intellectual Property Office of the People's Republic of China, dated Apr. 16, 2020, 16 pages.

International Search Report Issued in Application No. PCT/CN2017/111289, from ISA State Intellectual Property Office of the People's Republic of China, dated Jul. 30, 2018, WIPO, 4 pages.

* cited by examiner

METHOD AND APPARATUS FOR DETERMINING MOTION STATE OF USER EQUIPMENT

TECHNICAL FIELD

The present application relates to the field of communication technology, and in particular, to a method and an apparatus for determining a motion state of user equipment, an electronic device, and a computer readable storage medium.

BACKGROUND

In order to ensure the communication quality of user equipment with high-speed motion, an operator deploys a high-speed motion equipment dedicated network for the high-speed motion user equipment to access. In an overlapping region of the high-speed motion equipment dedicated network and a public network such as ordinary 4G and 5G communication networks, the high-speed motion equipment dedicated network generally has a higher signal strength than the public network, and because the user equipment often chooses a network with a higher signal strength to access, in the overlapping region, the user equipment with non-high-speed motion will also access the high-speed motion equipment dedicated network, which may cause congestion in the high-speed motion equipment dedicated network, and thereby affect the communication quality of the user equipment with high-speed motion.

In order to solve the above-described problem, in the related art, the user equipment determines its own motion state mainly by determining the number of cell handovers, and then determines whether to access the high-speed motion equipment dedicated network according to the motion state.

However, a cell in the high-speed motion equipment dedicated network is formed by cascading a plurality of RRUs (Radio Remote Units). That is, the cell in the high-speed motion equipment dedicated network includes a plurality of sub-cells with identical identifiers. When the user equipment accesses the cell in the high-speed motion equipment dedicated network, namely, the user equipment moves among the plurality of sub-cells in the cell, the user equipment will be always considered to be in the same cell because the plurality of sub-cells have identical identifiers. As such, the motion state of the user equipment cannot be accurately determined.

SUMMARY

In order to solve the technical problem existing in the related art, the present disclosure provides a method and an apparatus for determining a motion state of user equipment, an electronic device, and a computer readable storage medium.

According to a first aspect of the present disclosure, the method of determining a motion state of user equipment is provided, which includes:

recording information on a neighboring cell that neighbors with a cell where the user equipment is located;

determining a number of one or more pieces of the information on the neighboring cell recorded in unit time; and determining the motion state of the user equipment based on relationship between the determined number and one or more preset numbers as well as association of the relationship with at least one motion state.

Optionally, before the determining of the motion state of the user equipment, the method further includes:

receiving a signaling from a base station; and determining, based on the signaling, the one or more preset numbers and/or the association.

Optionally, the method of determining the motion state of the user equipment further includes:

determining, based on the motion state and the cell where the user equipment is located, whether to access a cell in a dedicated network for high-speed motion equipment or to access a cell in a public network.

Optionally, the one or more preset numbers include a first preset number and a second preset number greater than or equal to the first preset number, and, the determining of the motion state of the user equipment comprises:

in response to determining that the determined number is less than or equal to the first preset number, determining that the user equipment is in a low-speed motion state; and in response to determining that the determined number is greater than or equal to the second preset number, determining that the user equipment is in a high-speed motion state.

Optionally, the determining of whether to access the cell in the dedicated network for the high-speed motion equipment or to access the cell in the public network comprises:

when the user equipment is in the low-speed motion state and located in the cell in the dedicated network for the high-speed motion equipment, accessing the cell in the public network; and when the user equipment is in the high-speed motion state and located in the cell in the public network, accessing the cell in the dedicated network for the high-speed motion equipment.

Optionally, the dedicated network for the high-speed motion equipment comprises:

at least one of a high-speed railway dedicated network or a freeway dedicated network.

Optionally, the information on the neighboring cell comprises:

an identifier of the neighboring cell, system information on the neighboring cell, or a paging message from the neighboring cell.

According to a second aspect of the present disclosure, the apparatus for determining a motion state of user equipment is provided, which includes: an information recording module, a number determining module and a state determining module.

The information recording module is configured to record information on a neighboring cell that neighbors with a cell where the user equipment is located.

The number determining module is configured to determine a number of one or more pieces of the information on the neighboring cell recorded in unit time.

The state determining module is configured to determine the motion state of the user equipment based on relationship between the determined number and one or more preset numbers as well as association of the relationship with at least one motion state.

Optionally, the apparatus further includes: a signaling receiving module and a signaling determining module.

The signaling receiving module is configured to receive a signaling from a base station.

The signaling determining module is configured to determine the one or more preset numbers and/or the association based on the signaling.

Optionally, the apparatus further includes: an access determining module.

The access determining module is configured to determine, based on the motion state and the cell where the user equipment is located, whether to access a cell in a dedicated network for high-speed motion equipment or to access a cell in a public network.

Optionally, the one or more preset numbers include a first preset number and a second preset number greater than or equal to the first preset number, and the state determining module is configured to perform: in response to determining that the determined number is less than or equal to the first preset number, determining that the user equipment is in a low-speed motion state; and in response to determining that the determined number is greater than or equal to the second preset number, determining that the user equipment is in a high-speed motion state.

Optionally, the access determining module is configured to perform: when the user equipment is in the low-speed motion state and located in the cell in the dedicated network for the high-speed motion equipment, accessing the cell in the public network; and when the user equipment is in the high-speed motion state and located in the cell in the public network, accessing the cell in the dedicated network for the high-speed motion equipment.

Optionally, the dedicated network for the high-speed motion equipment comprises:

at least one of a high-speed railway dedicated network or a freeway dedicated network Optionally, the information on the neighboring cell comprises:

an identifier of the neighboring cell, system information on the neighboring cell, or a paging message from the neighboring cell.

According to a third aspect of the present disclosure, the electronic device is provided, which includes:

a processor; and a memory for storing instructions;

wherein the processor is configured to:

record information on a neighboring cell that neighbors with a cell where user equipment is located;

determine a number of one or more pieces of the information on the neighboring cell recorded in unit time; and determine the motion state of the user equipment based on relationship between the determined number and one or more preset numbers as well as association of the relationship with at least one motion state.

According to a fourth aspect of the present disclosure, there is provided the computer readable storage medium storing a computer program thereon, wherein the computer program is executable by a processor to perform operations comprising:

recording information on a neighboring cell that neighbors with a cell where user equipment is located;

determining a number of one or more pieces of the information on the neighboring cell recorded in unit time; and determining the motion state of the user equipment based on relationship between the determined number and one or more preset numbers as well as association of the relationship with at least one motion state.

According to examples of the present disclosure, the faster the motion speed of the user equipment is, the greater the number of pieces of information on the neighboring cell recorded in unit time is, while the slower the motion speed of the user equipment is, the less the number of pieces of information on the neighboring cell recorded in unit time is.

Therefore, the preset numbers as well as the association of the relationship between the preset numbers and the determined number of pieces of information on the neighboring cell recorded by the user equipment can be set in advance. Further, the relationship between the preset numbers and the determined number, and the association of the relationship with at least one motion state can be determined, so as to determine the motion state of the user equipment. Based on this, it is possible to accurately determine the motion state of the user equipment, thereby ensuring whether the user equipment accesses the dedicated network for the high-speed motion equipment can be then accurately determined according to the motion state of the user equipment.

BRIEF DESCRIPTION OF THE DRAWINGS

In order to more clearly illustrate the technical solutions in the examples of the present application, the drawings used for describing the examples will be briefly introduced below. Obviously, the drawings in the following description show only some of examples of the present application. For those of ordinary skill in the art, other drawings may also be obtained based on the drawings herein without involving inventive work.

DETAILED DESCRIPTION OF THE EMBODIMENTS

The technical solutions in the examples of the present application will be clearly, completely described with reference to the drawings involved therein. Apparently, the described examples are only a part of but not all examples of the present application. Based on the examples in the present application, all other examples obtained by those of ordinary skill in the art without involving inventive work shall fall within the protection scope of the present application.

Figure 1:
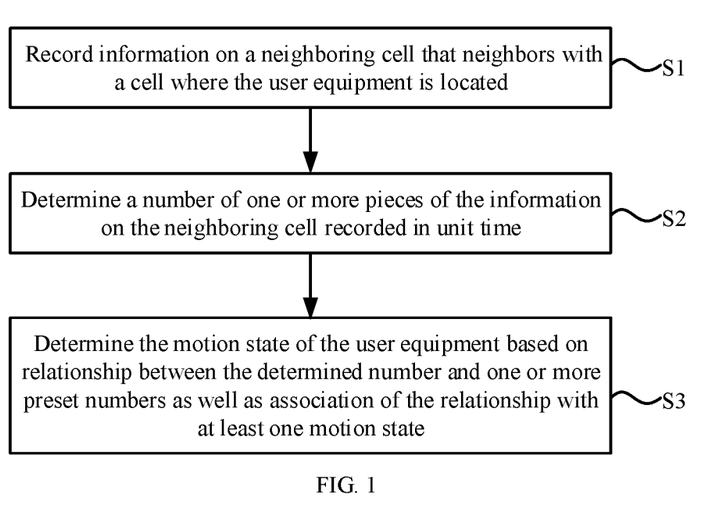
FIG. 1 is a schematic flowchart illustrating a method of determining a motion state of user equipment according to an example of the present disclosure.

FIG. 1 is a schematic flowchart illustrating a method of determining a motion state of user equipment according to an example of the present disclosure. The method of determining the motion state of the user equipment shown in this example may be applicable to user equipment such as a mobile phone and a tablet computer. As shown in FIG. 1, the method of determining the motion state of the user equipment may include the following steps.

At step S1, information on a neighboring cell that neighbors with a cell where the user equipment is located is recorded.

At step S2, a number of one or more pieces of the information on the neighboring cell recorded in unit time is determined.

In an example, the information of the neighboring cell may include an identifier of the neighboring cell, system information on the neighboring cell, a paging message from the neighboring cell, etc.

Taking the information of the neighboring cell being an identifier of the neighboring cell as an example, user equipment periodically detects the identifier of a cell neighboring to a cell where the user equipment is located, for example, in order to determine a cell suitable for access.

Figure 2:
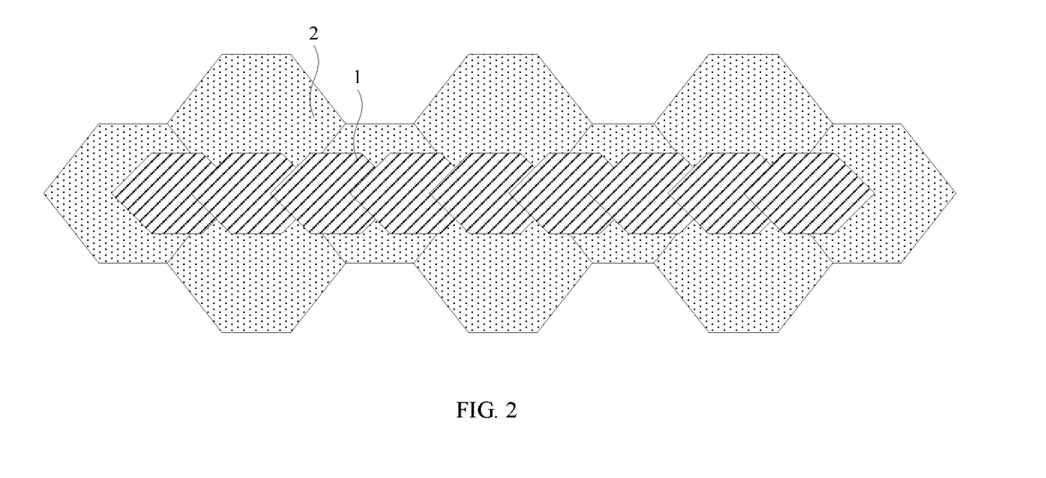
FIG. 2 is a schematic diagram illustrating a relationship between a cell in a dedicated network for a high-speed motion equipment and a cell in a public network according to an example of the present disclosure.

FIG. 2 is a schematic diagram illustrating a relationship between a cell in a dedicated network for a high-speed motion equipment and a cell in a public network according to an example of the present disclosure.

As shown in FIG. 2, a cell 1 in the dedicated network for the high-speed motion equipment includes a plurality of sub-cells, and the sub-cells each have an identical identifier, wherein the system information sent from each sub-cell may also be identical, and the paging message sent from each sub-cell may also be identical. For example, a cell where user equipment is located is the cell 1 in the dedicated network for the high-speed motion equipment, and a neighboring cell detected by the user equipment is a cell 2 in a public network neighboring to the cell 1 in the dedicated network for the high-speed motion equipment.

When the user equipment is in a stationary state, the neighboring cell which neighbors to the cell where the user equipment is located will not change, and the number of one or more pieces of information on the neighboring cell recorded in unit time includes only the number of one or more pieces of information of a current neighboring cell. When the user equipment is in a motion state, the neighboring cell which neighbors to the cell where the user equipment is located will change, and the number of pieces of information of the neighboring cell recorded in unit time includes the number of pieces of information of all neighboring cells on a motion path in unit time. Moreover, the faster the motion speed of the user equipment is, the longer the motion path in unit time is, and the greater the number is. For example, in FIG. 2, the cell where the user equipment is located is the cell 1 in the dedicated network for the high-speed motion equipment, and the faster the motion speed of the user equipment is, the greater the number of identifiers of the cell 2 in the public network recorded in unit time is.

At step S3, the motion state of the user equipment is determined based on relationship between the determined number and one or more preset numbers as well as association of the relationship with at least one motion state.

In an example, the relationships are different based on different preset numbers, and the corresponding number of motion states of the user equipment may also be different.

For example, if there is one preset number, a first relationship between the determined number and the preset number may be that the determined number is greater than or equal to the preset number, and a second relationship therebetween may be that the determined number is less than the preset number. A motion state corresponding to the first relationship may be a low-speed motion state, and a motion state corresponding to the second relationship may be a high-speed motion state.

For example, if there are two preset numbers, that is, a first preset number and a second preset number greater than the first preset number. A first relationship between the determined number and the preset numbers may be that, the determined number is less than the first preset number, a second relationship between the determined number and the preset numbers may be that, the determined number is greater than or equal to the first preset number and less than or equal to the second preset number, and a third relationship between the determined number and the preset numbers may be that the determined number is greater than the second preset number. A motion state corresponding to the first relationship may be a low-speed motion state, a motion state corresponding to the second relationship may be a medium-speed motion state, and a motion state corresponding to the third relationship may be a high-speed motion state.

In an example, the faster the motion speed of the user equipment is, the greater the determined number is; in contrast, the slower the motion speed of the user equipment is, the less the determined number is. Therefore, the preset numbers as well as the association of the relationship between the one or more preset numbers and the determined number can be set in advance. Further, the relationship between the preset number and the determined number, and the association of the relationship with at least one motion state can be determined, so as to determine the motion state of the user equipment.

For example, if the determined number is greater than the preset number, according to such relationship, it may be determined that the user equipment is in a high-speed motion state. For example, if the determined number is less than or equal to the preset number, according to such relationship, it may be determined that the user equipment is in a low-speed motion state. Based on this, it is possible to accurately determine the motion state of the user equipment, thereby ensuring whether the user equipment accesses the dedicated network for the high-speed motion equipment can be then accurately determined according to the motion state of the user equipment.

It should be noted that the one or more preset numbers and/or association in the example shown in FIG. 1 may be set on either user equipment or a base station.

Figure 3:
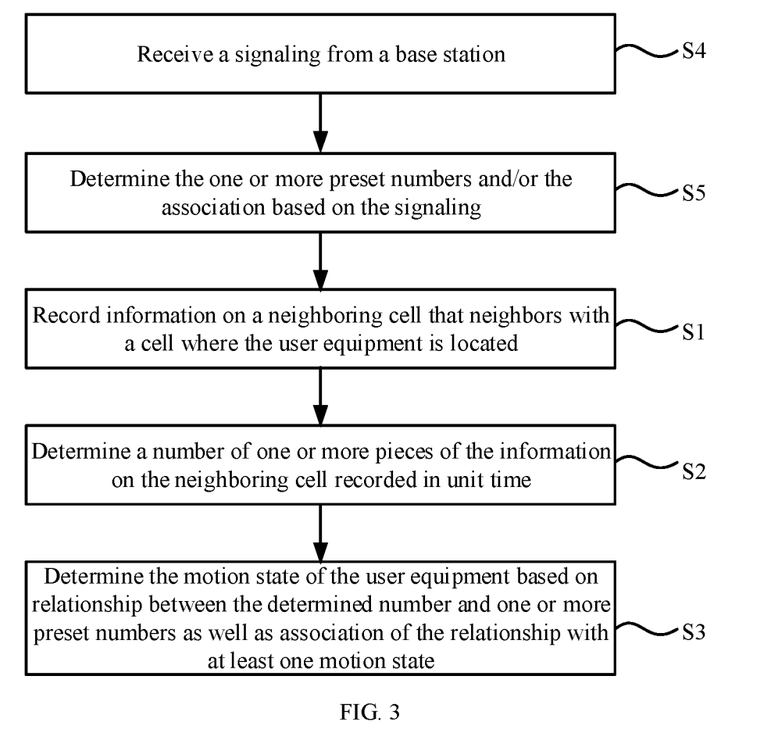
FIG. 3 is a schematic flowchart illustrating another method of determining a motion state of user equipment according to an example of the present disclosure.

FIG. 3 is a schematic flowchart illustrating another method of determining a motion state of user equipment according to an example of the present disclosure. As shown in FIG. 3, on the basis of the example shown in FIG. 1, before determining the motion state of the user equipment according to the relationship between the number and the one or more preset numbers, and the association of the relationship with at least one motion state, the method of determining the motion state of the user equipment may further include the following steps.

At step S4, a signaling from a base station is received.

At step S5, the one or more preset numbers and/or the association are/is determined based on the signaling.

In an example, the one or more preset numbers and/or the association may be set on a base station. The base station may broadcast or unicast the signaling to the user equipment, such that the user equipment receives the signaling from the base station. The signaling may be an RRC (Radio Resource Control) signaling. After receiving the signaling sent from the base station, the user equipment may determine one or more preset numbers and/or the association according to the signaling. Based on this, the one or more preset numbers and/or the association may be set on the base station, and may be conveniently modified as required, so that the user equipment receives the one or more preset numbers and/or the association required to be set.

Figure 4:
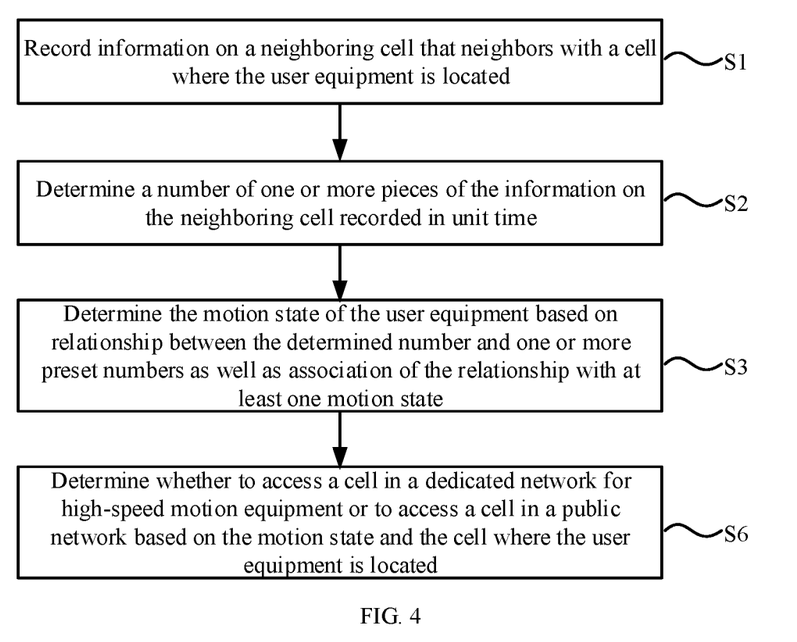
FIG. 4 is a schematic flowchart illustrating still another method of determining a motion state of user equipment according to an example of the present disclosure.

It should be noted that the steps S4 and S5 may be executed prior to the step S1 as shown in FIG. 4, and the execution order may also be adjusted as needed, so along as it is ensured to be executed prior to the step S3.

FIG. 4 is a schematic flowchart illustrating another method of determining a motion state of user equipment according to an example of the present disclosure. As shown in FIG. 4, on the basis of the example shown in FIG. 1, the method of determining the motion state of the user equipment further includes the following step.

At step S6, whether to access a cell in a dedicated network for high-speed motion equipment or to access a cell in a public network is determined based on the motion state and the cell where the user equipment is located.

In an example, after the motion state of the user equipment is determined, whether the user equipment accesses the cell in the dedicated network for the high-speed motion equipment or the cell in the public network may be further determined according to the motion state of the user equipment.

For example, the motion state includes a low-speed motion state and a high-speed motion state. When the motion state of the user equipment is a high-speed motion state, it is determined that the user equipment may access the cell in the dedicated network for the high-speed motion equipment, thereby ensuring that the dedicated network for the high-speed motion equipment provides a good communication environment for the user equipment with high-speed motion. When the motion state of the user equipment is a low-speed motion state, it is determined that the user equipment may access the cell in the public network, thereby ensuring that the user equipment with low-speed motion does not access the cell in the dedicated network for the high-speed motion equipment, avoiding that congestion in the dedicated network for the high-speed motion equipment, and improving the communication quality of the user equipment that accesses the dedicated network for the high-speed motion equipment.

Figure 5:
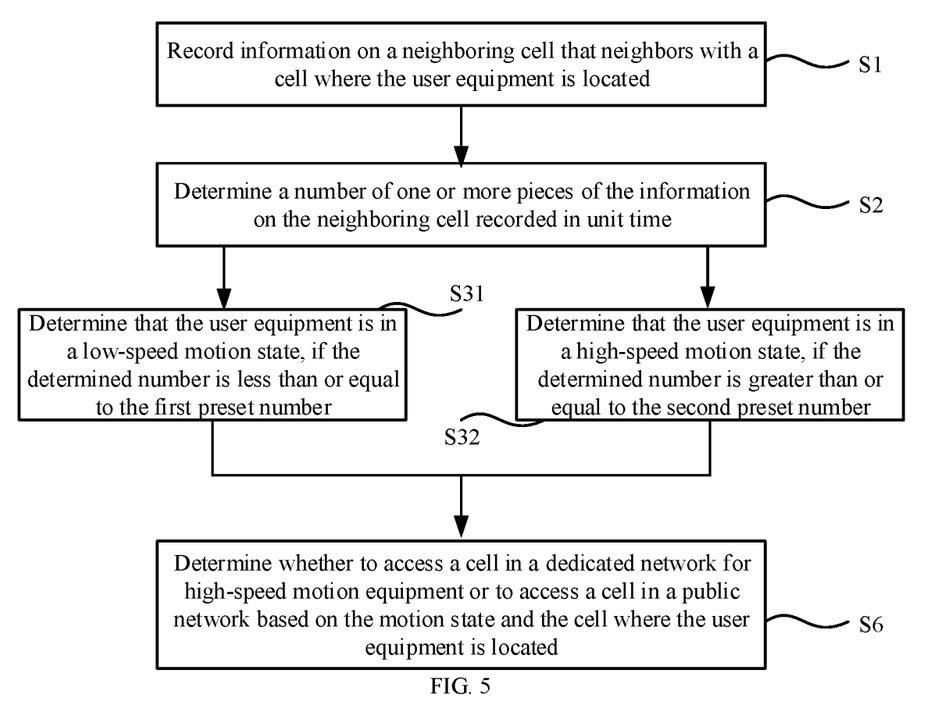
FIG. 5 is a schematic flowchart illustrating still even another method of determining a motion state of user equipment according to an example of the present disclosure.

FIG. 5 is a schematic flowchart illustrating another method of determining a motion state of user equipment according to an example of the present disclosure. As shown in FIG. 5, on the basis of the example shown in FIG. 4, the one or more preset numbers include a first preset number and a second preset number, and the second preset number is greater than or equal to the first preset number. The step that the motion state of the user equipment is determined according to the association of the relationship with at least one motion state includes the following steps.

At step S31, if the determined number is less than or equal to the first preset number, the user equipment is determined in a low-speed motion state.

At step S32, if the determined number is greater than or equal to the second preset number, the user equipment is determined in a high-speed motion state.

In an example, the faster the motion speed of the user equipment is, the greater the determined number is, while the slower the motion speed of the user equipment is, the less the determined number is. The second preset number is greater than or equal to the first preset number. Therefore, if the determined number is greater than or equal to the second preset number, it may be determined that the motion speed of the user equipment is fast, that is, the user equipment is in a high-speed motion state. If the determined number is less than or equal to the first preset number, it may be determined that the motion speed of the user equipment is slow, that is, the user equipment is in a low-speed motion state.

Figure 6:
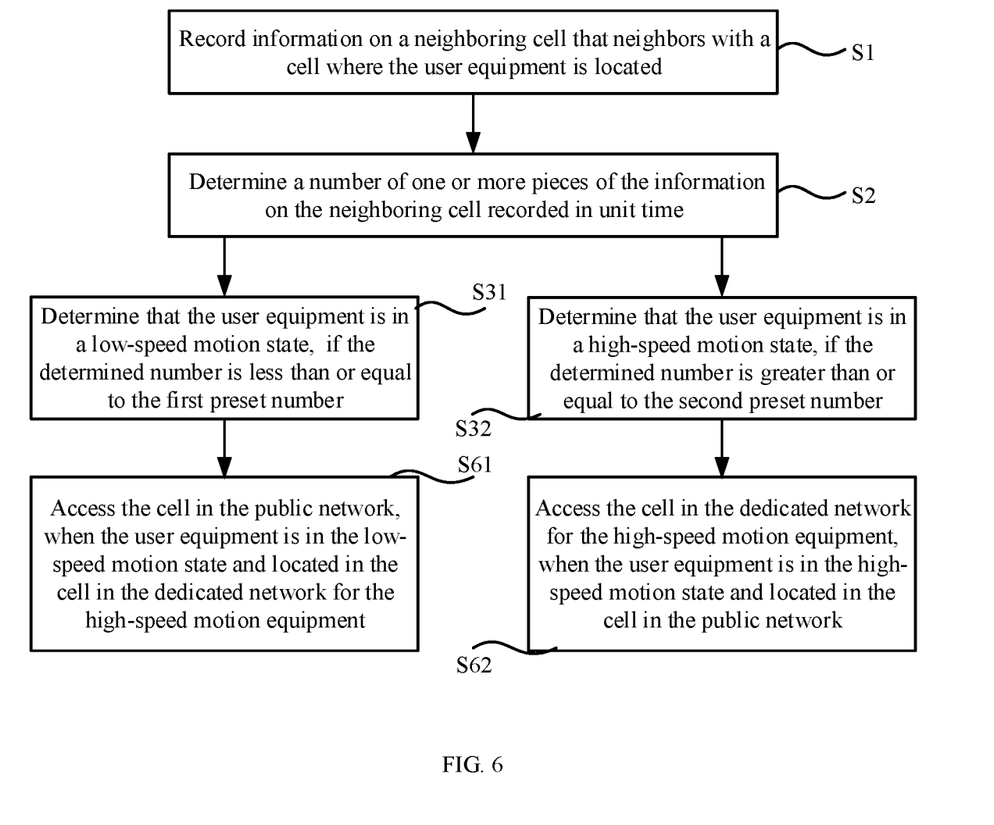
FIG. 6 is a schematic flowchart illustrating still yet another method of determining a motion state of user equipment according to an example of the present disclosure.

FIG. 6 is a schematic flowchart illustrating another method of determining a motion state of user equipment according to an example of the present disclosure. As shown in FIG. 6, on the basis of the example shown in FIG. 5, the step that whether to access the cell in the dedicated network for the high-speed motion equipment or to access the cell in the public network is determined according to the motion state and the cell where the user equipment is located includes the following steps.

At step S61, when the user equipment is in the low-speed motion state and located in the cell in the dedicated network for the high-speed motion equipment, the cell in the public network is accessed.

At step S62, when the user equipment is in the high-speed motion state and located in the cell in the public network, the cell in the dedicated network for the high-speed motion equipment is accessed.

In an example, when the motion state of the user equipment is a high-speed motion state, if the cell where the user equipment is located is a cell in a public network, frequent cell handovers that are required for the user equipment with high-speed motion in the cell in the public network make the communication quality lower, so that it may be determined to access the cell in the dedicated network for the high-speed motion equipment, thereby avoiding the frequent cell handovers for the user equipment with high-speed motion and ensuring its communication quality.

When the motion state of the user equipment is a low-speed motion state, if the cell where the user equipment is located is a cell in a dedicated network for a high-speed motion equipment, the user equipment with low-speed motion generally does not have the problem of frequent cell handovers, so that it is unnecessary to access the dedicated network for the high-speed motion equipment, and it may be determined to access the cell in the public network, thereby ensuring that the user equipment with low-speed motion does not access the cell in the dedicated network for the high-speed motion equipment, avoiding that congestion occurs in the dedicated network for the high-speed motion equipment, and ensuring the communication quality of the user equipment that accesses the dedicated network for the high-speed motion equipment.

On the basis of the example shown in FIG. 5, when the second preset number is greater than the first preset number, there exists a case that the determined number is less than the second preset number and greater than the first preset number. The user equipment in this case may be determined to be in a medium-speed motion state. The user equipment in the medium-speed motion state may be determined to access either the cell in the dedicated network for the high-speed motion equipment or the cell in the public network, which may be specifically set as needed.

Optionally, the dedicated network for the high-speed motion equipment includes:

a high-speed railway dedicated network and/or a freeway dedicated network.

In an example, a cell in the high-speed railway dedicated network may include a plurality of sub-cells, and an identifier of each sub-cell may be identical. A cell in the freeway dedicated network may include a plurality of sub-cells, and an identifier of each sub-cell may be identical. Based on this, when the cell where the user equipment is located is a cell in the high-speed railway dedicated network or a cell in the freeway dedicated network, the user equipment will identify each sub-cell as an identical cell, so that frequent cell handovers will not occur during the movement.

Optionally, the information of the neighboring cell includes:

an identifier of the neighboring cell, system information on the neighboring cell, or a paging message from the neighboring cell.

In an example, a cell in the dedicated network for the high-speed motion equipment may include a plurality of sub-cells, and an identifier of each sub-cell may be identical, and/or system information sent therefrom may be identical, and/or a paging message sent therefrom may be identical.

Corresponding to the method examples of determining a motion state of user equipment, the present disclosure also provides apparatus examples for determining the motion state of the user equipment.

Figure 7:
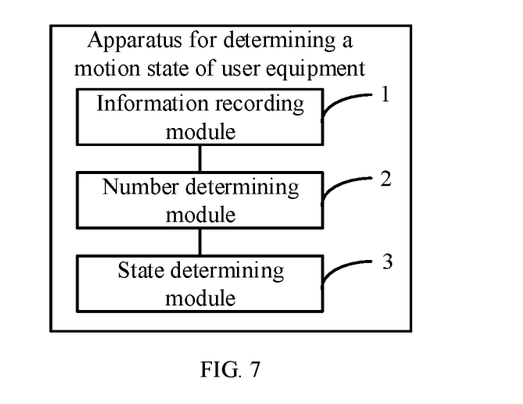
FIG. 7 is a schematic block diagram illustrating an apparatus for determining a motion state of user equipment according to an example of the present disclosure.

FIG. 7 is a schematic block diagram illustrating an apparatus for determining a motion state of user equipment according to an example of the present disclosure. As shown in FIG. 7, the apparatus for determining the motion state of the user equipment includes the following modules.

An information recording module 1 is configured to record information on a neighboring cell that neighbors with a cell where the user equipment is located.

A number determining module 2 is configured to determine a number of one or more pieces of the information on the neighboring cell recorded in unit time.

A state determining module 3 is configured to determine the motion state of the user equipment based on relationship between the determined number and one or more preset numbers as well as association of the relationship with at least one motion state.

Figure 8:
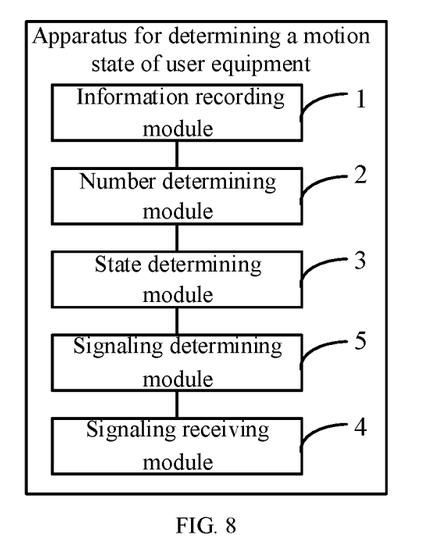
FIG. 8 is a schematic block diagram illustrating another apparatus for determining a motion state of user equipment according to an example of the present disclosure.

FIG. 8 is a schematic block diagram illustrating another apparatus for determining a motion state of user equipment according to an example of the present disclosure. As shown in FIG. 8, on the basis of the example shown in FIG. 7, the apparatus for determining the motion state of the user equipment further includes the following modules.

A signaling receiving module 4 is configured to receive a signaling from a base station.

A signaling determining module 5 is configured to determine the one or more preset numbers and/or the association based on the signaling.

Figure 9:
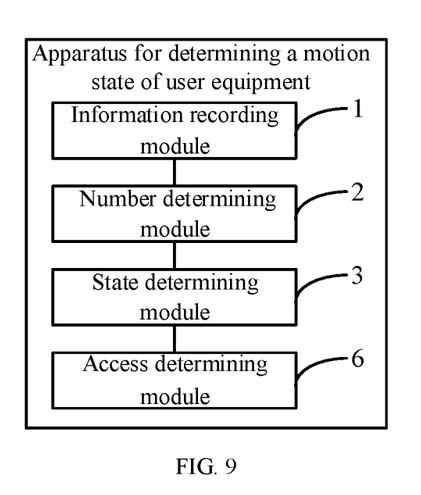
FIG. 9 is a schematic block diagram illustrating still another apparatus for determining a motion state of user equipment according to an example of the present disclosure.

FIG. 9 is a schematic block diagram illustrating another apparatus for determining a motion state of user equipment according to an example of the present disclosure. As shown in FIG. 9, on the basis of the example shown in FIG. 7, the apparatus for determining the motion state of the user equipment further includes the following modules.

An access determining module 6 is configured to determine, based on the motion state and the cell where the user equipment is located, whether to access a cell in a dedicated network for high-speed motion equipment or to access a cell in a public network.

Optionally, the one or more preset numbers include a first preset number and a second preset number greater than or equal to the first preset number, and the state determining module is configured to perform: in response to determining that the determined number is less than or equal to the first preset number, determining that the user equipment is in a low-speed motion state; and in response to determining that the determined number is greater than or equal to the second preset number, determining that the user equipment is in a high-speed motion state.

Optionally, the access determining module 6 is configured to perform: when the user equipment is in the low-speed motion state and located in the cell in the dedicated network for the high-speed motion equipment, accessing the cell in the public network; and when the user equipment is in the high-speed motion state and located in the cell in the public network, accessing the cell in the dedicated network for the high-speed motion equipment.

Optionally, the dedicated network for the high-speed motion equipment comprises:

at least one of a high-speed railway dedicated network or a freeway dedicated network.

Optionally, the information on the neighboring cell comprises:

an identifier of the neighboring cell, system information on the neighboring cell, or a paging message from the neighboring cell.

Regarding the apparatus in the above-described examples, the specific modes in which respective modules perform operations have been described in detail in the method examples, and will not be described in detail again.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

The examples of the present disclosure also provide an electronic device, including:

a processor and a memory for storing instructions, wherein the processor is configured to:

record information on a neighboring cell that neighbors with a cell where user equipment is located;

determine a number of one or more pieces of the information on the neighboring cell recorded in unit time; and determine the motion state of the user equipment based on relationship between the determined number and one or more preset numbers as well as association of the relationship with at least one motion state The examples of the present disclosure also provide a computer readable storage medium storing a computer program thereon, wherein the computer program is executable by a processor to perform operations comprising:

recording information on a neighboring cell that neighbors with a cell where user equipment is located;

determining a number of one or more pieces of the information on the neighboring cell recorded in unit time; and determining the motion state of the user equipment based on relationship between the determined number and one or more preset numbers as well as association of the relationship with at least one motion state.

Figure 10:
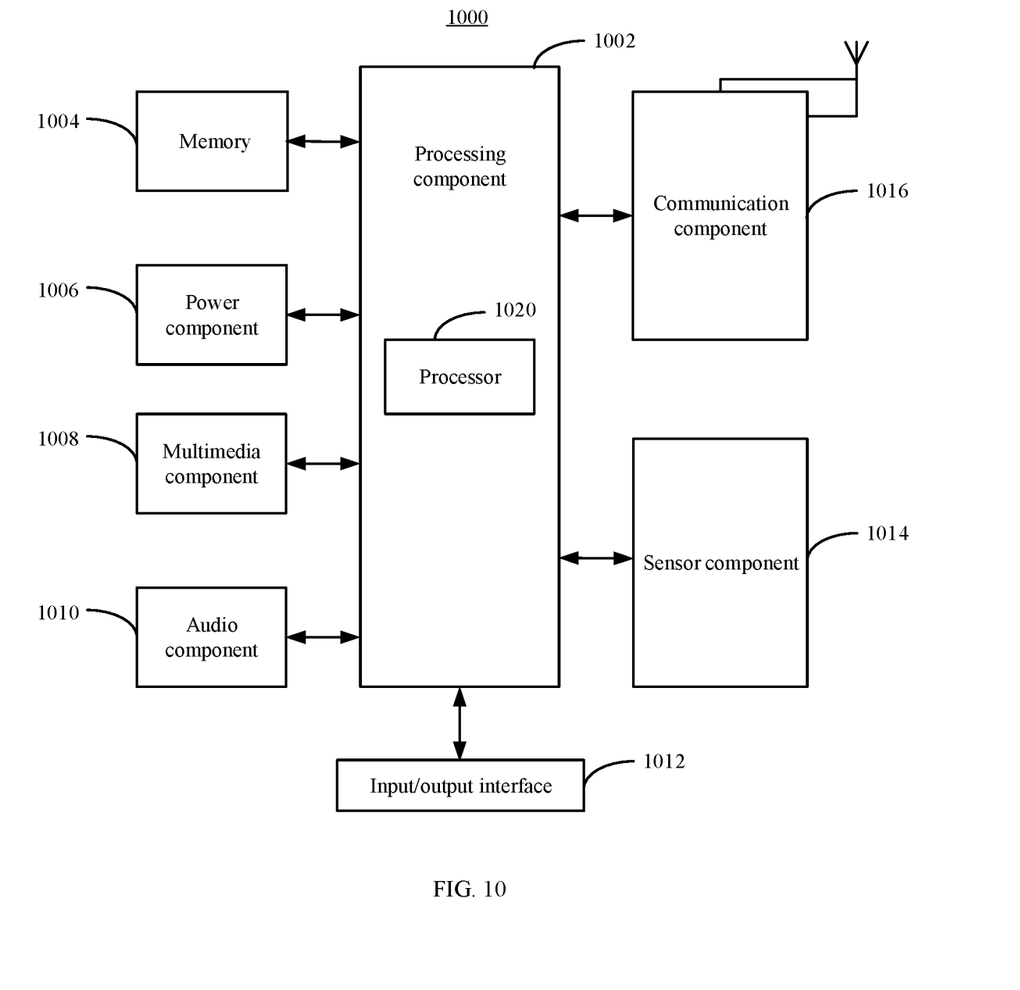
FIG. 10 is a schematic block diagram illustrating an apparatus for determining a motion state of user equipment according to an example of the present disclosure.

FIG. 10 is a schematic block diagram illustrating an apparatus 1000 for determining a motion state of user equipment according to an example of the present disclosure. For example, the apparatus 1000 may be a mobile phone, a computer, a digital broadcast terminal, a messaging transceiver, a game console, a tablet device, medical equipment, fitness equipment, a personal digital assistant, etc.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 usually controls the overall operation of the apparatus 1000, such as operations associated with display, telephone calls, data communications, camera operations, and recording operations. The processing component 1002 may include one or more processors 1020 to execute instructions to perform all or part of the steps in the methods described above. Moreover, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 is configured to store various types of data to support operation at the apparatus 1000. Examples of these data include instructions for any application or method operating at the apparatus 1000, contact data, phone book data, messages, pictures, videos, and the like. The memory 1004 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1006 provides power to various components of the apparatus 1000. The power component 1006 may include a power management system, one or more power sources, and other components associated with power generated, managed, and distributed for the apparatus 1000.

The multimedia component 1008 includes a screen that provides an output interface between the apparatus 1000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1008 includes a front camera and/or a rear camera. When the apparatus 1000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some examples, the audio component 1010 also includes a loudspeaker for outputting an audio signal.

The I/O interface 1012 provides an interface between the processing component 1002 and a peripheral interface module which may be a keyboard, a click wheel, a button, or the like. These buttons may include, but are not limited to a home button, a volume button, a start button, and a lock button.

The sensor component 1014 includes one or more sensors for providing a status assessment in various aspects to the apparatus 1000. For example, the sensor component 1014 may detect an open/closed state of the apparatus 1000, and the relative positioning of components, for example, the component is a display and a keypad of the apparatus 1000. The sensor component 1014 may also detect a change in position of the apparatus 1000 or a component of the apparatus 1000, the presence or absence of a user in contact with the apparatus 1000, the orientation or acceleration/deceleration of the apparatus 1000 and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some examples, the sensor component 1014 may also include an acceleration sensor, a gyro sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 2G or 3G, or a combination thereof. In an example, the communication component 1016 receives broadcast signals or broadcast associated information from an external broadcast management system via a broadcast channel. In an example, the communication component 1016 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the method according to any of examples as described above.

In an example, there is also provided a non-transitory computer readable storage medium including instructions, such as a memory 1004 including instructions, wherein the instructions are executable by the processor 1020 of the apparatus 1000 to perform the method as described above. For example, the non-transitory computer readable storage medium may be a ROM, a random access memory (RAM), a CD-ROM, a magnetic tape, a floppy disk, and an optical data storage device.

It should be noted that, in this context, relational terms such as "first" and "second" are used merely to distinguish one entity or operation from the other entity or operation, and do not necessarily require or imply the existence of any such actual relationship or order between these entities or operations. The terms "comprising", "including" or any other variants thereof are intended to cover non-exclusive inclusion, such that a process, method, article, or device including a series of elements includes not only those elements but also other elements not specifically listed, or further includes elements inherent to such process, method, article, or device. Under the circumstance of no more limitation, an element limited by the phrase "comprising a . . . " does not exclude the presence of additional equivalent elements in the process, method, article, or device that includes the element.

The method and apparatus provided by the examples of the present invention are described above in detail. Specific examples are used herein to explain the principles and embodiments of the present invention. The description of the above examples is only for helping to understand the method according to the present invention and its core idea. At the same time, for those skilled in the art, in accordance with the idea of the present invention, there will be changes in specific embodiments and application scope. In summary, the contents of this specification should not be construed as a limitation to the present invention.

The invention claimed is:

1. A method of determining a motion state of user equipment, comprising:
   recording information on a neighboring cell that neighbors with a cell where the user equipment is located;
   determining a number of one or more pieces of the information on the neighboring cell recorded in unit time, wherein the number of the one or more pieces of the information of the neighboring cell recorded in the unit time comprises a number of pieces of information of all neighboring cells on a motion path in the unit time; and
   determining the motion state of the user equipment based on relationship between the determined number and one or more preset numbers as well as association of the relationship with at least one motion state.

2. The method according to claim 1, before the determining of the motion state of the user equipment, further comprising:
   receiving a signaling from a base station; and
   determining, based on the signaling, the one or more preset numbers and the association.

3. The method according to claim 1, further comprising:
   determining, based on the motion state and the cell where the user equipment is located, whether to access a cell in a dedicated network for high-speed motion equipment or to access a cell in a public network.

4. The method according to claim 3, wherein the one or more preset numbers include a first preset number and a second preset number greater than or equal to the first preset number, and
   the determining of the motion state of the user equipment comprises one of:
   in response to determining that the determined number is less than or equal to the first preset number, determining that the user equipment is in a low-speed motion state; and
   in response to determining that the determined number is greater than or equal to the second preset number, determining that the user equipment is in a high-speed motion state.

5. The method according to claim 4, wherein the determining of whether to access the cell in the dedicated network for the high-speed motion equipment or to access the cell in the public network comprises one of:
   when the user equipment is in the low-speed motion state and located in the cell in the dedicated network for the high-speed motion equipment, accessing the cell in the public network; and
   when the user equipment is in the high-speed motion state and located in the cell in the public network, accessing the cell in the dedicated network for the high-speed motion equipment.

6. The method according to claim 3, wherein the dedicated network for the high-speed motion equipment comprises at least one of a high-speed railway dedicated network or a freeway dedicated network.

7. The method according to claim 1, wherein the information on the neighboring cell comprises one of:
   an identifier of the neighboring cell, system information on the neighboring cell, or a paging message from the neighboring cell.

8. User equipment, comprising:
   a processor; and
   a memory storing instructions executable by the processor;
   wherein the processor is configured to:
   record information on a neighboring cell that neighbors with a cell where the user equipment is located;
   determine a number of one or more pieces of the information on the neighboring cell recorded in unit time, wherein the number of the one or more pieces of the information of the neighboring cell recorded in the unit time comprises a number of pieces of information of all neighboring cells on a motion path in the unit time; and
   determine the motion state of the user equipment based on relationship between the determined number and one or more preset numbers as well as association of the relationship with at least one motion state.

9. The user equipment according to claim 8, wherein the processor is further configured to:
   receive a signaling from a base station; and
   determine the one or more preset numbers and the association based on the signaling.

10. The user equipment according to claim 8, wherein the processor is further configured to:
    determine, based on the motion state and the cell where the user equipment is located, whether to access a cell in a dedicated network for high-speed motion equipment or to access a cell in a public network.

11. The user equipment according to claim 10, wherein the one or more preset numbers include a first preset number and a second preset number greater than or equal to the first preset number, and
    the processor is configured to perform one of:
    in response to determining that the determined number is less than or equal to the first preset number, determining that the user equipment is in a low-speed motion state; and
    in response to determining that the determined number is greater than or equal to the second preset number, determining that the user equipment is in a high-speed motion state.

12. The user equipment according to claim 11, wherein the processor is further configured to perform one of:
    when the user equipment is in the low-speed motion state and located in the cell in the dedicated network for the high-speed motion equipment, accessing the cell in the public network; and when the user equipment is in the high-speed motion state and located in the cell in the public network, accessing the cell in the dedicated network for the high-speed motion equipment.

13. The user equipment according to claim 10, wherein the dedicated network for the high-speed motion equipment comprises at least one of a high-speed railway dedicated network or a freeway dedicated network.

14. The user equipment according to claim 8, wherein the information on the neighboring cell comprises one of:
   an identifier of the neighboring cell, system information on the neighboring cell, or a paging message from the neighboring cell.

15. A non-transitory computer-readable storage medium storing a computer program thereon, wherein the computer program is executable by a processor to perform operations comprising:
   recording information on a neighboring cell that neighbors with a cell where user equipment is located;
   determining a number of one or more pieces of the information on the neighboring cell recorded in unit time, wherein the number of the one or more pieces of the information of the neighboring cell recorded in the unit time comprises a number of pieces of information of all neighboring cells on a motion path in the unit time; and
   determining the motion state of the user equipment based on relationship between the determined number and one or more preset numbers as well as association of the relationship with at least one motion state.

* * * * *